March 20, 1934.  M. A. DAMBRINE  1,951,505
ELECTRICALLY DRIVEN CHILD'S AUTO
Filed Nov. 3, 1932  6 Sheets-Sheet 1
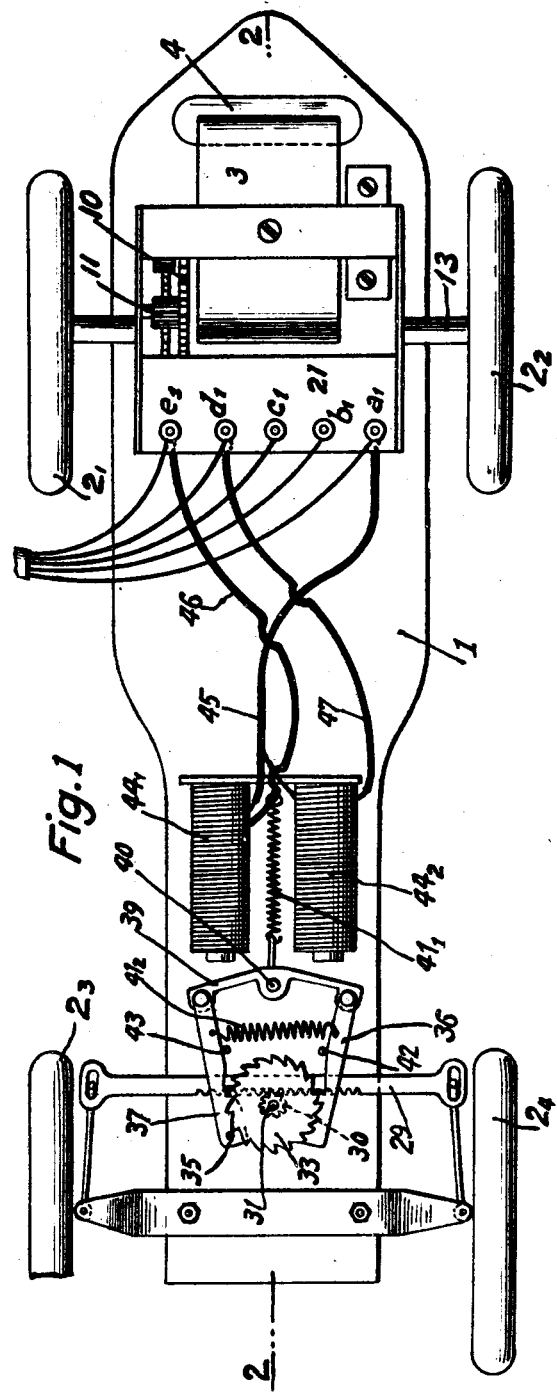
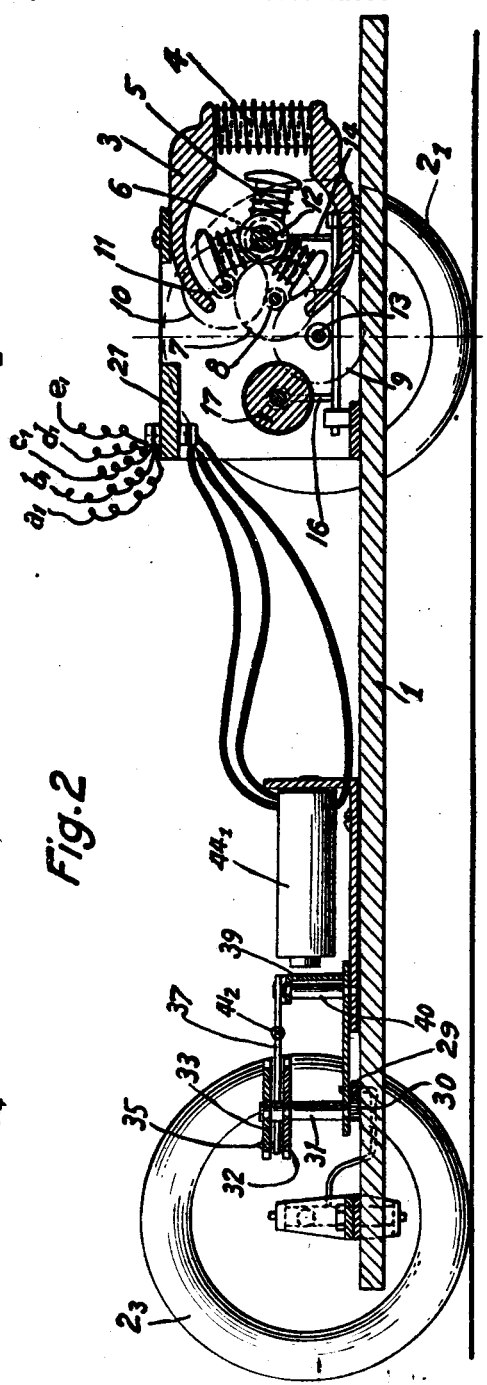
Maurice Alfred Dambrine
INVENTOR;
his Attorney March 20, 1934.  M. A. DAMBRINE  1,951,505
ELECTRICALLY DRIVEN CHILD'S AUTO
Filed Nov. 3, 1932    6 Sheets-Sheet 2
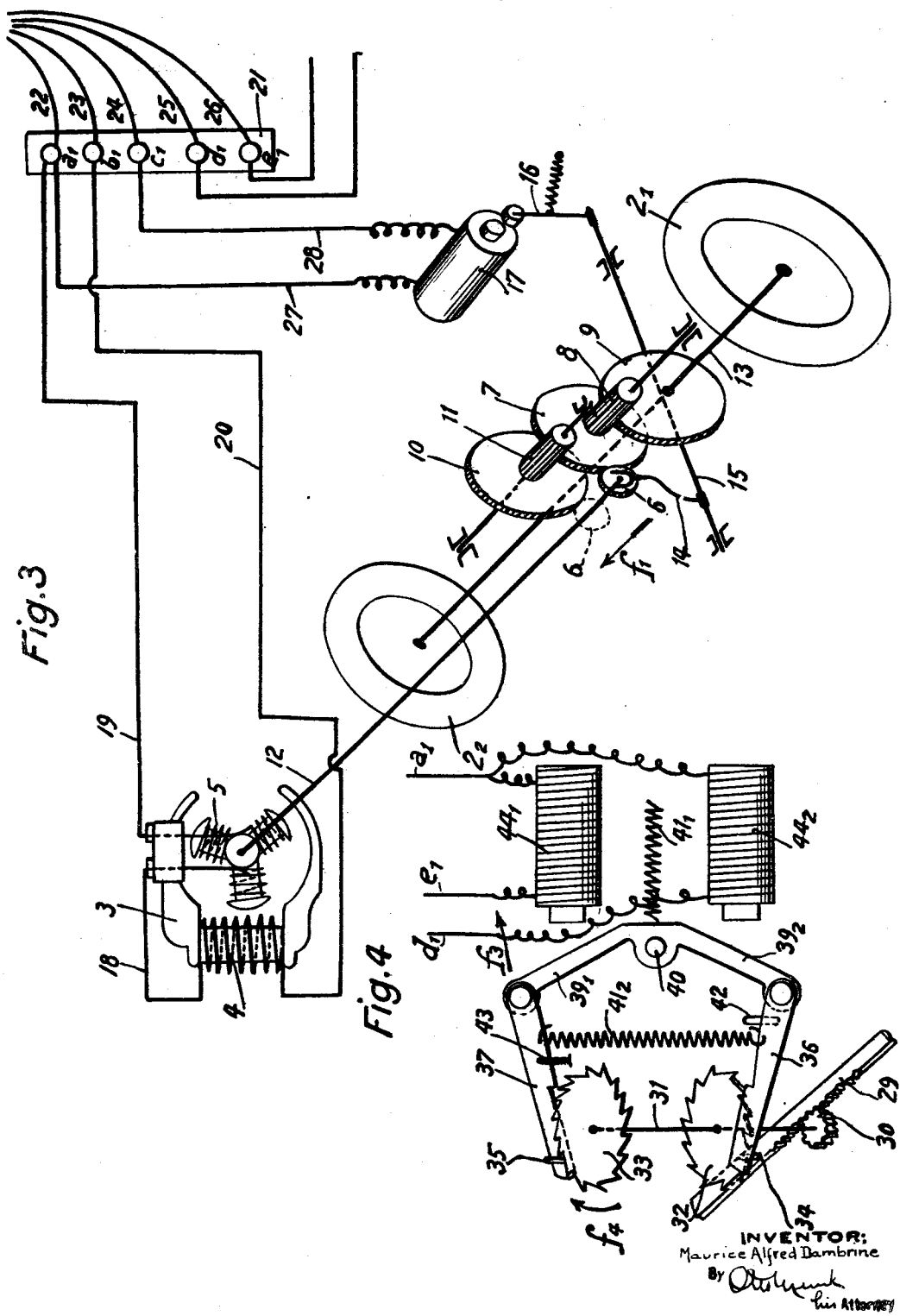

March 20, 1934.  M. A. DAMBRINE  1,951,505
ELECTRICALLY DRIVEN CHILD'S AUTO
Filed Nov. 3, 1932   6 Sheets-Sheet 3

Maurice Alfred Dambrine
INVENTOR;

March 20, 1934.     M. A. DAMBRINE     1,951,505
ELECTRICALLY DRIVEN CHILD'S AUTO
Filed Nov. 3, 1932     6 Sheets-Sheet 4
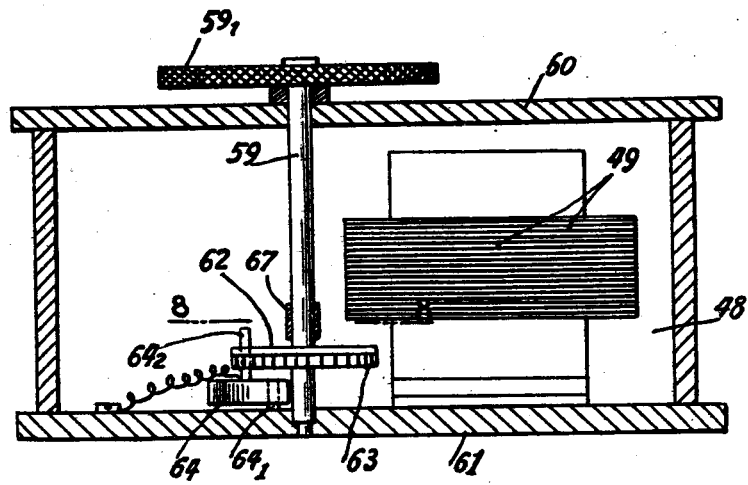
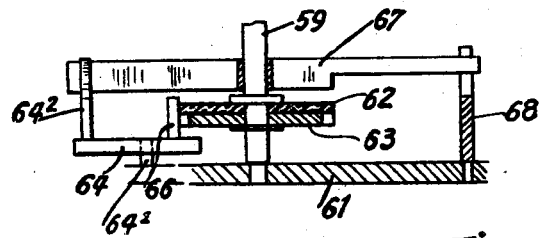
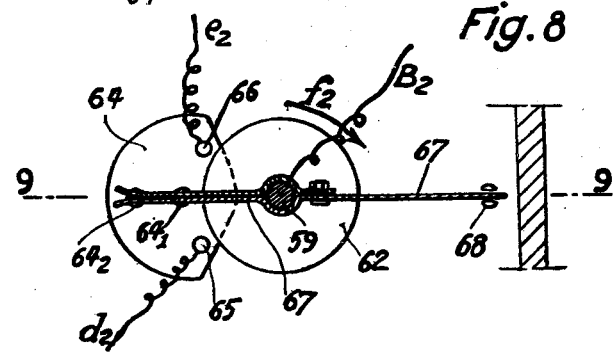
Maurice Alfred Dambrine
INVENTOR

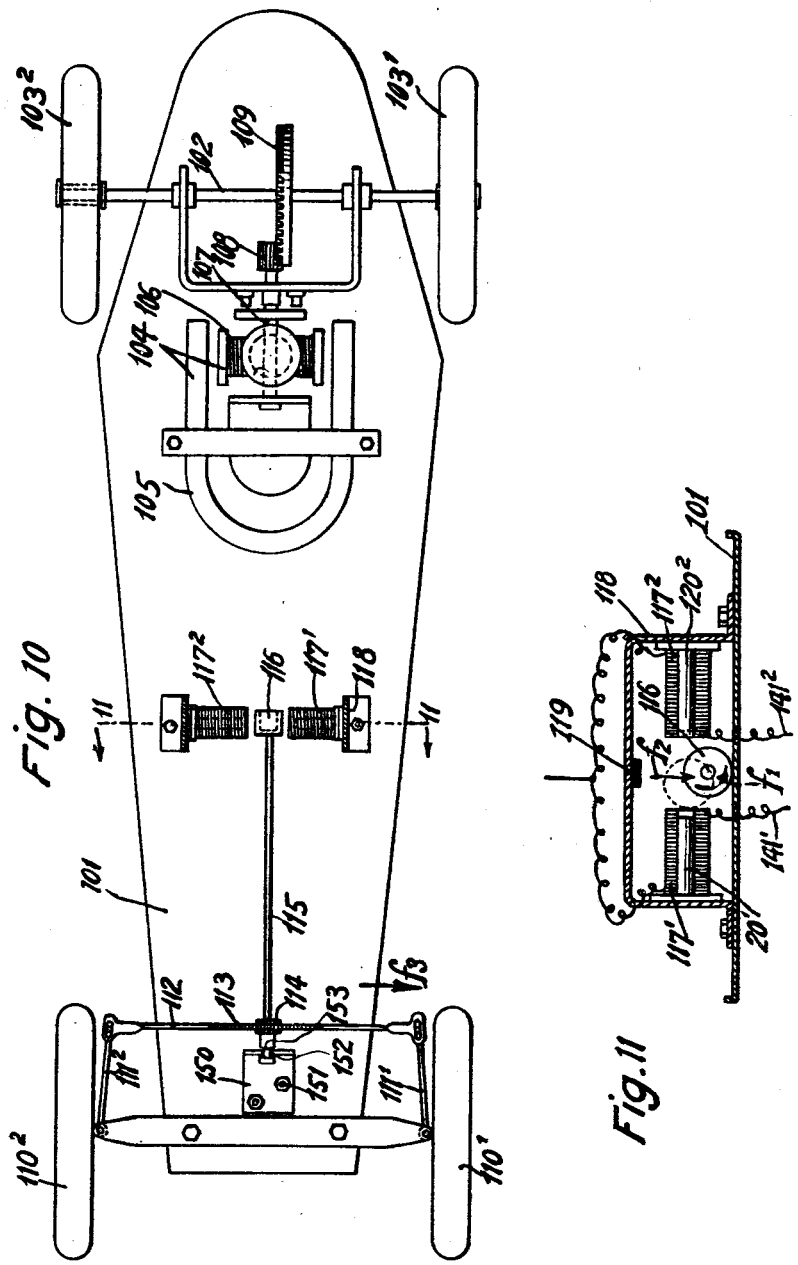

March 20, 1934.  M. A. DAMBRINE  1,951,505
ELECTRICALLY DRIVEN CHILD'S AUTO
Filed Nov. 3, 1932  6 Sheets-Sheet 6
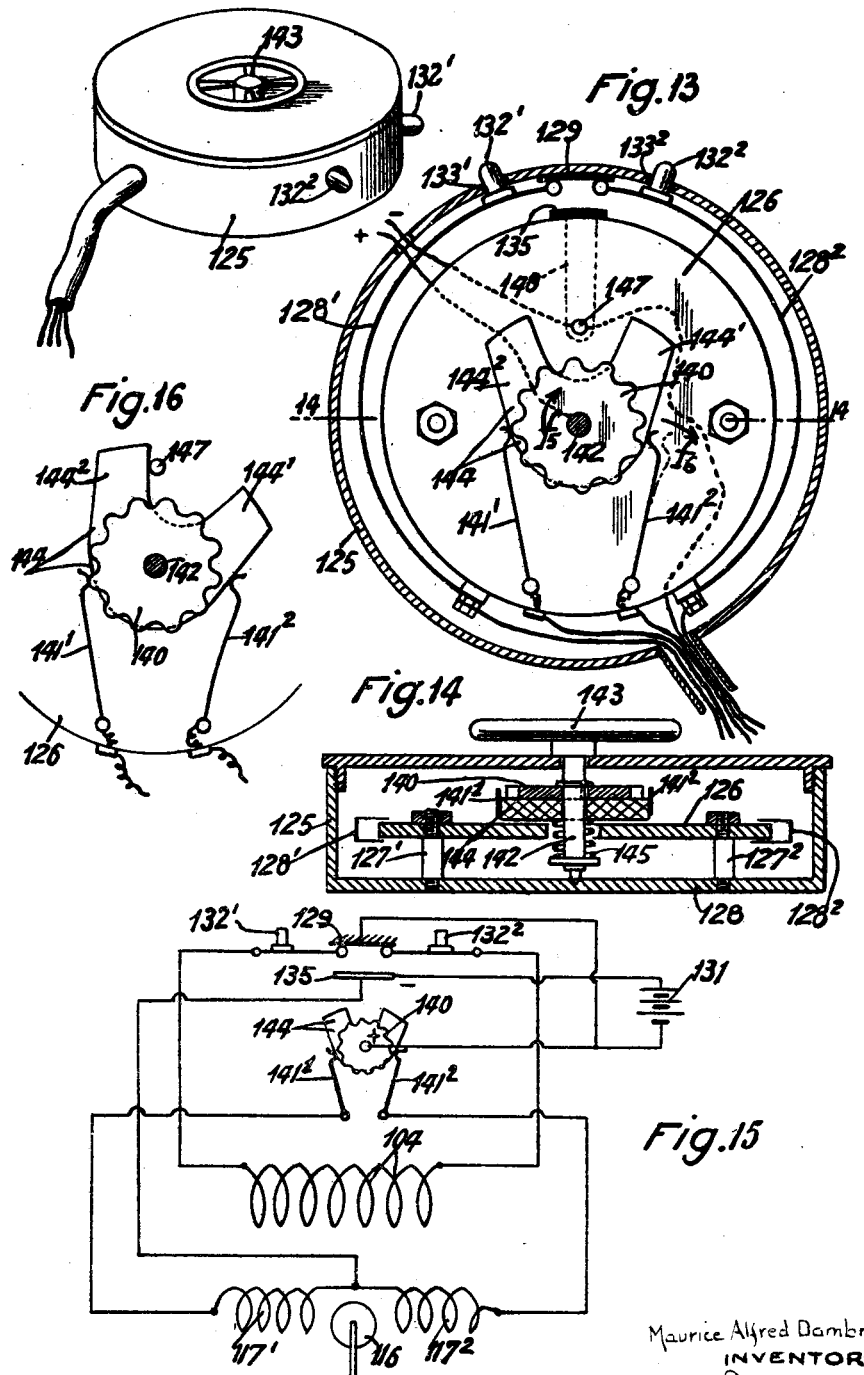
Maurice Alfred Dambrine
INVENTOR;
By
Attorney Patented Mar. 20, 1934

1,951,505

UNITED STATES PATENT OFFICE 1,951,505

ELECTRICALLY DRIVEN CHILD'S AUTO

Maurice Alfred Dambrine, Montrouge, France

Application November 3, 1932, Serial No. 640,947
In France November 16, 1931

9 Claims. (Cl. 46—48)

The object of the present invention is to produce an electrically driven car for children which can be moved along different routes at the will of the driver.

A second object of the invention is to produce a vehicle of this description in which the driver may, without moving from one position, operate the different driving gears and vary the direction of the vehicle.

A further object is to allow of this child's vehicle being used in a room as well as in the open air.

Another object is to produce a vehicle which will allow the child who is driving it to steer it from a distance so as to avoid any obstacles encountered on the way and so as to develop judgment on the part of the child.

Finally, an object is to produce an electrically driven toy vehicle having a very simple construction and at very moderate cost.

Children's vehicles which allow of the foregoing objects being realized have the features embodied in the following description and in the claims enumerated at the end of the said description.

Children's vehicles according to the invention are illustrated by way of example in the annexed drawings wherein:

Fig. 1 is a plan view of an autocar according to a first practical method of carrying out the invention.

Fig. 2 is a section taken on the line 2—2 of Fig. 1.

Fig. 3 is a diagram of the motor and of the wheel-driving mechanism.

Fig. 4 is a diagram of the steering gear.

Fig. 7 is a section taken on the line 7—7 in Fig. 5.

Fig. 8 is a partial section taken on the line 8—8 of Fig. 7.

Fig. 9 is a section taken on the line 9—9 in Fig. 8.

Fig. 10 represents a plan view of a child's vehicle according to another method of carrying out the invention.

Fig. 11 is a transverse view on a larger scale of the said child's vehicle and taken on the line 11—11 in Fig. 10.

Fig. 12 is a perspective view of the steering controller in the vehicle in question.

Fig. 13 is a plan view of the said steering controller with the cover detached.

Figure 5:
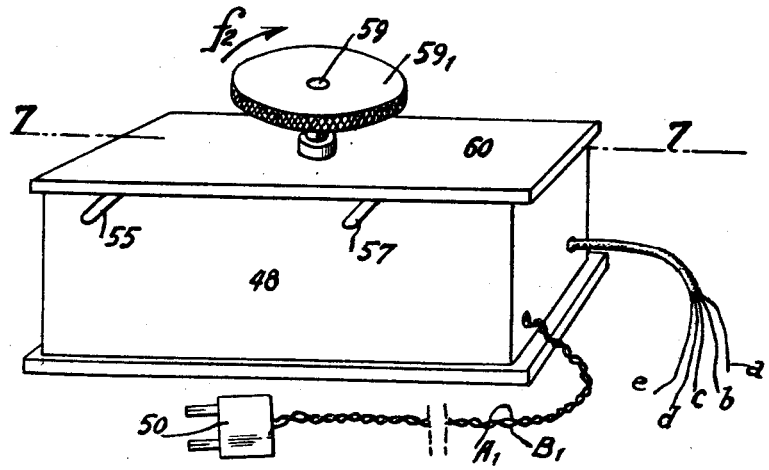
Fig. 5 is a perspective view of the control-box.

Fig. 14 denotes a partial section taken on the line 14—14 in Fig. 13.

Fig. 15 is a diagram showing the electric connections for the child's vehicle of Figs. 10 to 14.

Fig. 16 is a plan view of the steering controller so as to illustrate the manner in which it functions.

The child's car represented in Figs. 1–9 is made up of the following component parts:

A chassis 1 (Figs. 1 and 2) carried by four wheels $2^1$, $2^2$, $2^3$, $2^4$, supports, at its rear, the wheel-driving system and, in front, the steering gear. The driving system (Figs. 1, 2, 3) includes an electric motor 3 having a field winding 4 and armature 5 which drives the wheels by means of a gear train 6, 7, 8, 9, 10, 11.

The driving pinion 6 of the gear system is keyed slidingly to the shaft 12 which carries the armature 5. This pinion 6 normally meshes with a toothed wheel 7 integral with a second pinion 8 which, in its turn, meshes with a second toothed wheel 9 frictionally mounted on the axle 13 so as to avoid any damage to the gear train when the automobile is driven by hand.

The driving pinion 6 is free to slide on its shaft 12 under the control of a fork 14. This pinion can, therefore, be put in engagement with a third toothed wheel 10 integral with a pinion 11 which is in constant engagement with the first toothed wheel 7.

The fork 14 is keyed on a shaft 15 on the extremity of which is mounted an armature 16 situated so as to face the core of an electromagnet 17.

The armature 5 and the field winding 4 of motor 3, which are connected in series by wire 18, are electrically connected by wires 19, 20 to the terminals $a_1$, $b_1$.

The electro-magnet 17 is electrically connected to the terminals $a_1$ $c_1$ by the wires 27, 28 (Fig. 3).

The terminals $a_1$ $b_1$ $c_1$ and two other terminals $d_1$ $e_1$ are mounted on an insulating plate 21 attached to the chassis 1.

Figure 6:
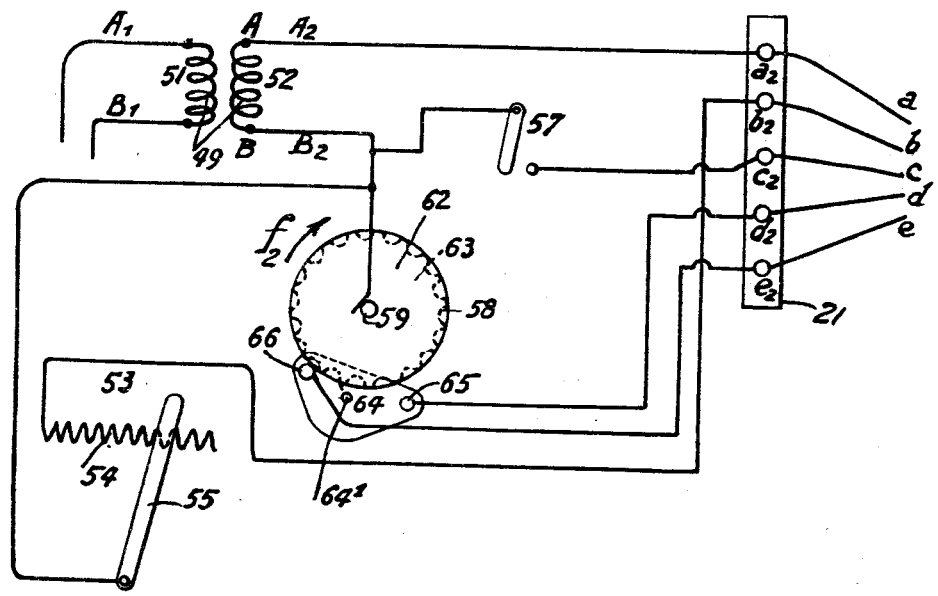
Fig. 6 is an electric diagram of the control-box.

Electric wires 22, 23, 24, 25, 26 serve to connect the terminals $a_1$ $b_1$ $c_1$ $d_1$ $e_1$ to corresponding terminals $a_2$ $b_2$ $e_2$ on the electric control box (Fig. 6).

The steering wheels $2_3$ $2_4$ are operated by a toothed rack 29 (Figs. 1, 2 and 4) which is in constant engagement with a pinion 30. On the shaft 31 of pinion 30 are keyed two ratchet wheels 32, 33 having their teeth arranged in opposite directions.

The teeth of each of the wheels 32, 33 may be engaged by two pins 34, 35 respectively which are integral with levers 36, 37.

The levers 36, 37 are each jointed to one end of an armature 39 which is pivoted on a pin 40 and is controlled by two electro-magnets $44^1$, $44^2$ are situated in front of each arm $39^1$, $39^2$ of the armature 39.

A release spring 41 tends constantly to keep the pin 40 in a position at equal distances from the extremities of the cores of the electro-magnets $44^1$, $44^2$.

A second release spring $41_2$ tends steadily to press the pins 34, 35 of levers 36, 37 against the teeth of the ratchet wheels 32, 33.

Two stops 42, 43 limit the travel of levers 36, 37 and prevent the two pins 34, 35 from coming simultaneously into engagement with their respective teeth which would jam the whole mechanism.

The winding of the electro-magnet $44^1$ is connected to the terminals $a_1$ $e_1$ by means of wires 45, 46 (Figs. 3 and 4) while the winding of the electro-magnet $44^2$ is connected to the terminals $a_1$ $d_1$ by means of wires 45, 47.

The control box (Figs. 5–9) consists of a casing 48, of wood for example, in which are fitted the following accessory parts.

A transformer 49 receives the electric current from the mains through leads $A_1$ $B_1$ and the mains plug 50. The purpose of this transformer is to lower the voltage of the mains to a value which is not dangerous. To this end it comprises a primary coil 51 and a secondary coil 52 one end A of which is connected to the terminal $a^2$.

A rheostat 53 with a resistance winding 54 and an operating lever 55 is inserted between the terminal B of the transformer 49 and the terminal $b^2$. This rheostat serves to control the flow of current in the motor circuit 3 which produces the changes of speed of the vehicle. A switch 57 is inserted between the terminal B and the terminal $c_2$ and this switch serves to bring the electro-magnet 17 into operation.

A commutator 58 is arranged on spindle 59 which passes through the upper wall 60 of the box 48 and is journalled in the upper wall 60 and in the lower wall 61 of box 48. The spindle 59 is provided on the outside of the box with an operating wheel $59^1$. This commutator 58 comprises an insulating disc 62 united to a toothed disc 63 of the same external diameter as insulating disc 62, and the spindle 59 of commutator is electrically connected to the pole $B_2$.

An insulating rocker 64 oscillating on a pin $64^1$ parallel to the spindle 59 carries two studs 65 and 66 electrically connected to the terminals $d_2$ $e_2$.

A staple $64^2$ fixed on the rocker 64 acts at the extremity of a spring 67 consisting of two blades which grip between them the spindle 59 in such a manner that a rotation of this spindle produces by friction, the displacement of spring 67. A projection 68 ensures the return of spring 67 and fork 64 to their mean position when the spindle 59 is released.

The manner in which this automobile functions is as follows:

When an electric current is set through the field winding 4 and the armature 5 of motor 3 (Fig. 3) by operating the rheostat 53 (Fig. 6), the motor 3 begins to rotate, thus driving the rear wheels through the gear train 6, 7, 8, 9. In this way the automobile is moved forward.

If the switch 57 is closed (Fig. 6), a current passes through the electro-magnet 17 (Fig. 3) which thus attracts the armature 16, the said armature 16 then causing the rotation of spindle 15 and the displacement, in the direction $f_1$, of the fork 14. As a result, the pinion 6 is disengaged from wheel 7 and engages with the toothed wheel 10.

The supplementary wheel 10 is thus inserted operatively into the gear system and this produces backward motion of the automobile.

The remote control of steering of the automobile is produced by turning the operating wheel $59^1$ of the commutator 58.

For example, a rotation of this wheel $59^1$ in the direction $f^2$ (Figs. 5, 6, 8) produces the displacement of spring 67 in the direction $f^2$ and brings the stud 66 to bear on the toothed periphery 63. Owing to the insulating disc 62, the stud 66 can only come into contact with the projections of the said toothed periphery 63. At each contact an electric current is passed into the electro-magnet $44_1$ (Fig. 4), the said electro-magnet then attracting the arm $39_1$ in the direction $f_3$. Thus the lever 37 is moved in the direction $f_3$ also and produces the rotation of the ratchet wheel 33 in the direction $f^4$. The front wheels turn to the right to an amount corresponding with the number of teeth through which the toothed periphery 63 has been turned. In this way a rotation of the front wheels is produced of precisely the amount desired.

By turning the wheel $59^1$ in the direction opposite to $f^2$ there is obtained in the same way as before but through the intermediary of the contact 65 and the electro-magnet $44^2$, a turning of the wheels towards the left.

In another practical method of realization illustrated in Figs. 10–16 the child's car includes essentially a stage or platform 101 suitably shaped and forming the chassis of the vehicle.

The chassis 101 carries at the rear a driving axle 102 on which are mounted the rear wheels $103^1$, $103^2$; one of these wheels, $103^1$ is keyed on the said driving axle 102 while the other wheel $103^2$ is idly mounted on the said axle; this arrangement allows the vehicle to be moved with great facility when turning without the necessity of fitting up a differential gear, which is another simplification in the construction.

The driving axle 102 is driven by a small electro-magnetic motor 104 comprising a magnet 105 between the poles of which turns an armature 106. The spindle 107 of this electro-magnetic motor carries a small pinion 108 which engages directly with a large toothed wheel 109 keyed on the driving axle 102 which constitutes a reduction transmission system of great simplicity and produceable at minimum cost.

The fact that the driving motor of the vehicle consists of a small electro-magnetic motor, that is to say a permanent magnet motor, allows of the immediate change of the motor's rotating direction and therefore the direction in which the vehicle moves by simply reversing the direction of current through the armature coil.

The chassis 101 carries, in front, the steering wheels $110^1$, $110^2$, the connecting rods $111^1$, $111^2$, of which are connected to each of the extremities of a steering rack 112. This rack 112 is toothed at 113 and engages with a small pinion 114 which is rotated by an electro-magnetic drive constituted as follows.

The spindle 115 on the extremity of which is keyed the pinion 114 carries at its other extremity a roller 116 of magnetic metal and to reduce the weight this roller is hollow within and is in the form of a thimble.

The spindle 115 is supported by a small bearing 150, which is itself secured to the chassis 1 by bolts 151; this bearing 150 has a notch 152 into which is fitted a groove 153 cut in the extremity of the spindle 115, which is thus maintained between the bearing 150 and the rack 113 in mesh with the pinion 114.

The roller 116 is mounted with a certain amount of play between two coils $117^1$, $117^2$ which are fed from the source of current and are controlled from the single controller as will be explained below; in this way only one of these coils $117^1$, $117^2$ is rendered operative at a time and is energized in an intermittent manner by the aid of a contactor described more minutely below.

When one of the coils, for example $117^1$, is energized (Fig. 11) it attracts the small roller 116 which then executes a slight rotational movement about its axis in the direction $f^1$ so as to come into contact with the core $120^1$ of said coil; when this coil $117^1$ is no longer energized, the roller falls back on its support by its own weight in the direction $f^2$. The roller 116 is thus made to execute small successive rotational movements in the direction $f^1$ and this produces a rotation of spindle 115 in the same direction and consequently the displacement of the rack 113 and the steering bar 112 in the direction $f^3$ corresponding to a turning of the steering wheels $110^1$ $110^2$ to the right.

Conversely if it is the coil $117^2$ which is energized, the roller 116 turns in a direction opposite to $f^1$, this representing a rotation of the steering wheels $110^1$ and $110^2$ to the left.

The two coils $117^1$ $117^2$ are mounted on a bridge 118 of magnetic metal, this bridge ensuring the propagation of the field through the two coils $117^1$ and $117^2$.

In order to prevent the roller 116 when attracted by the coils $117^1$ $117^2$ from remaining fixed, the support on which the roller 116 freely rests is made of non-magnetic metal such as, for instance, is obtained by making the chassis from an aluminium plate. For the same purpose there is fitted on the magnetic bridge 118 a non-magnetic stop 119 to prevent the roller from becoming fixed on the same bridge through the influence of the residual magnetic field.

Lastly, the cores $120^1$ and $120^2$ of the coils $117^1$ $117^2$ are slightly withdrawn into the interior of the coils which also prevents the roller from remaining permanently against the cores of coils $117^1$ and $117^2$.

The single controller (Fig. 12) which controls the electro-magnetic motor 104 as well as the coils $117^1$ and $117^2$ of the steering system, comprises essentially a box 125 containing and entirely enclosing all the contacting fitments and this box 125 is made very small in size which enables the driver to hold it easily in his hand.

Within the box 125 is mounted a support 126 of insulating material and this support 126 is secured by means of the studs $127^1$ $127^2$ to the bottom 128 of the box 125 (Figs. 13 and 14).

For the control of the driving motor two flexible plates $128^1$ $128^2$ are fitted round the insulating disc 126 and normally bear on a contact 129 carried by the frame of box 125, the said contact 129 being connected, for instance, to the positive pole of the current source such as the battery 131 (Fig. 15).

These two flexible and conductor blades $128^1$ and $128^2$ may be operated from outside the box 125 by means of two push buttons $132^1$, $132^2$ projecting through apertures $133^1$, $133^2$, in box 125; under the action of these push buttons $132^1$, $132^2$ the flexible blades $128^1$ $128^2$ are made to bear on a contact 135 carried by the insulating support 126 and connected to the other pole of the current source 131. At the other end these flexible blades $128^1$, $128^2$ are connected respectively to the extremities of the armature coil 106 of the motor 104.

Under these conditions if one of the buttons $132^1$ or $132^2$ is pushed, the electro-magnetic motor 104 is connected to the battery and the vehicle is put in motion.

By referring to the diagram of Fig. 15 it will be seen that according to which one of the flexible blades $128^1$, $128^2$ is displaced, the current will pass through the motor coil in one direction or the opposite, thus causing the motor to turn in the one direction or the other corresponding to a forward or rearward motion of the vehicle.

For the purpose of controlling the steering of the vehicle, the electric contactor operating the coils $117^1$, $117^2$ consists of a toothed conducting disc 140 connected to the positive pole of the current source while the return wire from coils $117^1$ $117^2$ is connected to the negative pole.

The disc 140 is carried by a spindle 142 which may be operated from outside the box 125 by means of a small wheel 143.

On the spindle 142 is frictionally mounted an insulating cam 144 which is forced against the conductor disc 140 by a spiral spring 145. When, for instance, the spindle is rotated in the direction of $f^5$, this cam 144 is driven by friction and first pushes, in the direction of $f^6$, one of the contact blades $141^2$ and withdraws it from the conductor periphery 140, while, on the other hand, the profile of this cam is shaped so that the other contact blade $141^1$ comes into engagement with the teeth of the conductor disc 140 (Fig. 16).

In this way the circuit of the coil $117^1$ is intermittently closed, this coil corresponding to the direction in which the disc 140 is turned and producing the deflections of the vehicle as has already been seen.

When the wheel 143 is released the elasticity of the blades $141^1$, $141^2$ restores the cam 144 to its intermediary position (Fig. 4) in which neither of the contacting blades $141^1$, $141^2$ can come into engagement with the toothed disc 140, thus cutting off all supply of current to the coils $117^1$ or $117^2$.

A central stop 147 arranged between the two arms $144^1$, $144^2$ of the insulating cam 144 limits the angular displacement of the said cam in both directions, this central stop 147 may advantageously consist of the extremity of the screw used for fixing a connecting piece 148 serving to conduct the current to the contact stud 135 for the motor drive.

By this invention there are thus produced toy vehicles capable of being operated by means of a single controller, the vehicles themselves being of simple construction and produceable at a moderate cost.

What I claim as my invention and desire to secure by Letters Patent is:—

1. In an electrically driven toy vehicle; a chassis; driving wheels mounted on the said chassis; an electric motor carried by the chassis and operating the driving wheels; steering wheels mounted on the chassis; a horizontal steering bar movable on the chassis and operating the steering wheels; a toothed rack carried by the said steering bar; a rotary spindle carried by the chassis, a pinion keyed on this spindle and engaging with the rack of the steering bar; two ratchet wheels with oppositely positioned teeth, keyed to the spindle; two pawls engaging respectively with the said two ratchet wheels; two conjugate electromagnets mounted on the chassis and operating respectively the said two pawls; a current controller independent of the toy vehicle; connecting members mounted on the said controller; flexible conductor wires connected to the connecting members of the controller and feeding the electric motor and the two electromagnets mounted on the chassis of the toy vehicle.

2. In an electrically driven toy vehicle, a chassis, driving wheels mounted on the said chassis; an electric motor carried by the chassis and operating the driving wheels; steering wheels mounted on the chassis; a horizontal steering bar movable on the chassis and operating the steering wheels, a toothed rack carried by the said steering bar; a rotating spindle carried by the chassis, a pinion keyed to the said spindle and engaging with the teeth of the rack of the steering bar, a roller of magnetic metal keyed to the spindle, two electro-magnets mounted on the chassis and arranged on either side of the roller of magnetic metal and attracting the said roller and then releasing it so as to give it a motion of rotation, a current controller independent of the toy vehicle, connecting members mounted on the said controller, flexible conductor wires joined up with the connecting members of the controller and feeding the electric motor and the two electromagnets mounted on the chassis of the toy vehicle.

3. In an electrically driven toy vehicle; a chassis of non-magnetic metal; driving wheels mounted on the said chassis, an electric motor carried by the chassis and operating the driving wheels, steering wheels mounted on the chassis, a horizontal steering bar movable on the chassis and operating the steering wheels, a toothed rack carried by the said steering bar, a rotary spindle carried by the chassis, a pinion keyed on this spindle and engaging with the teeth of the steering bar, a roller of magnetic metal keyed to the spindle and resting on the chassis, a bridge of magnetic metal, having both vertical and horizontal portions, mounted on this chassis above the aforementioned roller, a non-magnetic stop mounted on the transverse portion of the bridge and above the said roller, two electro-magnets carried by the vertical portions of the bridge, and arranged on either side of the magnetic metal roller and attracting the said roller and thereafter releasing it so as to impart to it a rotating movement, a current controller independent of the toy vehicle, connecting members mounted on the said controller, flexible conducting wires joined up to the connecting members of the controller and feeding the electric motor and the two electro-magnets mounted on the chassis of the toy vehicle.

4. In an electrically driven toy vehicle, a chassis, driving wheels mounted on the said chassis and operating the driving wheels, steering wheels mounted on the chassis, a horizontal steering bar movable on the chassis and operating the steering wheels, a toothed rack carried by the said steering bar, a rotary spindle carried by the chassis, a pinion keyed to the said spindle and engaging with the teeth of the rack of the steering bar, a roller of magnetic metal keyed to the spindle, two electromagnets with retracted cores, the said electromagnets being mounted on the chassis and arranged on either side of the magnetic metal roller and attracting the said roller and then releasing it so as to impart to it a rotation movement, a current controller independent of the toy vehicle, connecting members mounted on the said controller, flexible conducting wires joining up with the connecting members of the controller and feeding the electric motor and the two electromagnets mounted on the chassis of the toy vehicle.

5. In an electrically driven toy vehicle, a chassis, a motor axle carried by the said chassis, two driving wheels keyed on the motor axle, a gear train carried by the chassis and operating the motor axle, a motor spindle carried by the chassis, an electric motor carried by the chassis and driving the motor spindle, a driving pinion driven by the motor spindle sliding on the said spindle and operating the gear train in one direction or the other, an electromagnet mounted on the chassis and controlling the position of the said pinion, steering wheels mounted on the chassis, a progressively acting steering mechanism mounted on the chassis and operating the steering wheels, an electromagnetic device mounted on the chassis and operating the steering mechanism, a current controller independent of the toy vehicle, connecting members mounted on the said controller, flexible conducting cables joining up with the connecting members of the distribution post and feeding the electric motor, the electromagnet of the driving pinion and also the electromagnetic steering device being mounted on the chassis of the toy vehicle.

6. In an electrically driven toy vehicle, a chassis; driving wheels mounted on said chassis; an electric motor carried by said chassis and operating the driving wheels steering wheels mounted on said chassis a progressively operating steering mechanism mounted on said chassis and progressively actuating said steering wheels; an electromagnetic device mounted on said chassis and actuating the progressively actuating steering mechanism while current flows through the electromagnetic device, a current distributor independent of the toy vehicle; terminals mounted on said distributor, flexible conductor wires connected with said terminals of the distributor and feeding the electric motor as well as the electromagnetic steering device mounted on the chassis of the toy vehicle.

7. In an electrically driven toy vehicle, a chassis; driving wheels mounted on the chassis; an electric motor mounted on the chassis and operating the driving wheels; steering wheels mounted on the chassis a progressively actuating steering mechanism mounted on the chassis and progressively actuating the steering wheels; an electromagnetic device mounted on the chassis and actuating the progressively actuating steering mechanism as well as current flowing through said electromagnetic device, a current distributor independent of the toy vehicle; terminals mounted on said distributor; flexible conductor wires connected with said terminals on the distributor and feeding electric motor; a commutator comprising a rotating toothed disc mounted on said distributor; studs connected with the electromagnetic device and contacting with the toothed disc, whereby successive contacts made during the rotation of said disc determine the progressive action of the electromagnetic device and the steering mechanism.

8. In an electrically driven toy vehicle, a chassis; driving wheels mounted on the chassis; an electric motor mounted on the chassis and operating the driving wheels; steering wheels mounted on the chassis; a progressively acting steering mechanism mounted on the chassis and progressively actuating the steering wheels; an electromagnetic device mounted on the chassis and actuating the progressively acting steering mechanism as well as current flows through the electromagnetic devices; a current distributor independent of the toy vehicle; terminals mounted on said distributor; flexible conductor wires connected with said terminals on the distributor and feeding the electric motor, a commutator comprising the toothed disc and a shaft carrying said disc and rotatably mounted on the distributor, an insulating support mounted to oscillate on the distributor and actuated by the shaft of the toothed disc; studs mounted on the insulating support and moved by said support into contact with the toothed disc upon the rotation of said disc and its shaft, whereby the successive contacts thus produced determine the progressive action of the electromagnetic device and of the steering mechanism.

9. In an electrically driven toy vehicle, a chassis; driving wheels mounted on said chassis, an electric motor carried by said chassis and operating the driving wheels; steering wheels mounted on said chassis; a progressively acting steering mechanism mounted on the chassis and progressively actuating the steering wheels; an electromagnetic device mounted on the chassis and actuating the progressively acting steering mechanism as well as current traversing the electromagnetic device; a current distributor independent of said toy vehicle; terminals mounted on said distributor; flexible conductor wires connected with said terminals on the distributor and feeding the electric motor; a commutator comprising a toothed disc and a shaft carrying said disc and rotatably mounted on the distributor, an insulating support adapted to oscillate on said distributor and actuated by the shaft of the toothed disc; studs mounted on the insulating support and moved with said support into contact with the toothed disc during the rotation of said disc and its shaft, the successive contact thus produced determining the progressive action of the electromagnetic device and of the steering mechanism; a release spring engaging the insulating support and tending constantly to move studs out of contact with the toothed disc as soon as the toothed disc ceases to operate.

MAURICE ALFRED DAMBRINE.